United States Patent [19]

Bartholomew

[11] Patent Number: 5,761,845
[45] Date of Patent: Jun. 9, 1998

[54] FISH HOOK LURE AND LEADER CARRIER

[76] Inventor: Mark Bartholomew, 1285 E. 300 North, American Fork, Utah 84003

[21] Appl. No.: 876,955

[22] Filed: Jun. 17, 1997

Related U.S. Application Data

[63] Continuation-in-part of Ser. No. 608,749, Feb. 29, 1996, abandoned.

[51] Int. Cl.⁶ ................................................. A01K 97/06
[52] U.S. Cl. ..................... 43/57.1; 206/315.11; 224/920
[58] Field of Search .......................... 43/54.1, 57.1, 43/57.2; 224/920; 206/315.11

[56] References Cited

U.S. PATENT DOCUMENTS

| 920,663 | 5/1909 | Schaney | 43/57.1 |
|---|---|---|---|
| 1,850,074 | 3/1932 | Crandall . | |
| 2,201,305 | 5/1940 | Springer | 43/54.1 |
| 3,464,143 | 9/1969 | Scott | 43/57.1 |
| 4,036,451 | 7/1977 | Pipkin | 43/57.1 |

FOREIGN PATENT DOCUMENTS

| 0484361 | 6/1952 | Canada | 43/57.1 |
|---|---|---|---|
| 0008442 | 4/1896 | United Kingdom | 43/57.1 |
| 0015223 | 5/1900 | United Kingdom | 43/57.1 |

*Primary Examiner*—Jack W. Lavinder
*Attorney, Agent, or Firm*—Delbert R. Phillips

[57] ABSTRACT

A fish hook lure and leader carrier is formed from plastic. It has a basic configuration having a tubular structure with two caps, one on each end. The interior of the tubular structure houses the hooks and/or lures in the interior cavities. The leader extends through slots in the interior cavity and wraps around the outside of the tubular structure. When the two caps are snapped onto the ends the leader is held firmly in place. The interior cavity may contain a septum separating it into two cavities. These cavities may have end walls that occlude half the opening at each end of the tubular structure. The end walls are not opposite providing access to the two cavities.

6 Claims, 5 Drawing Sheets

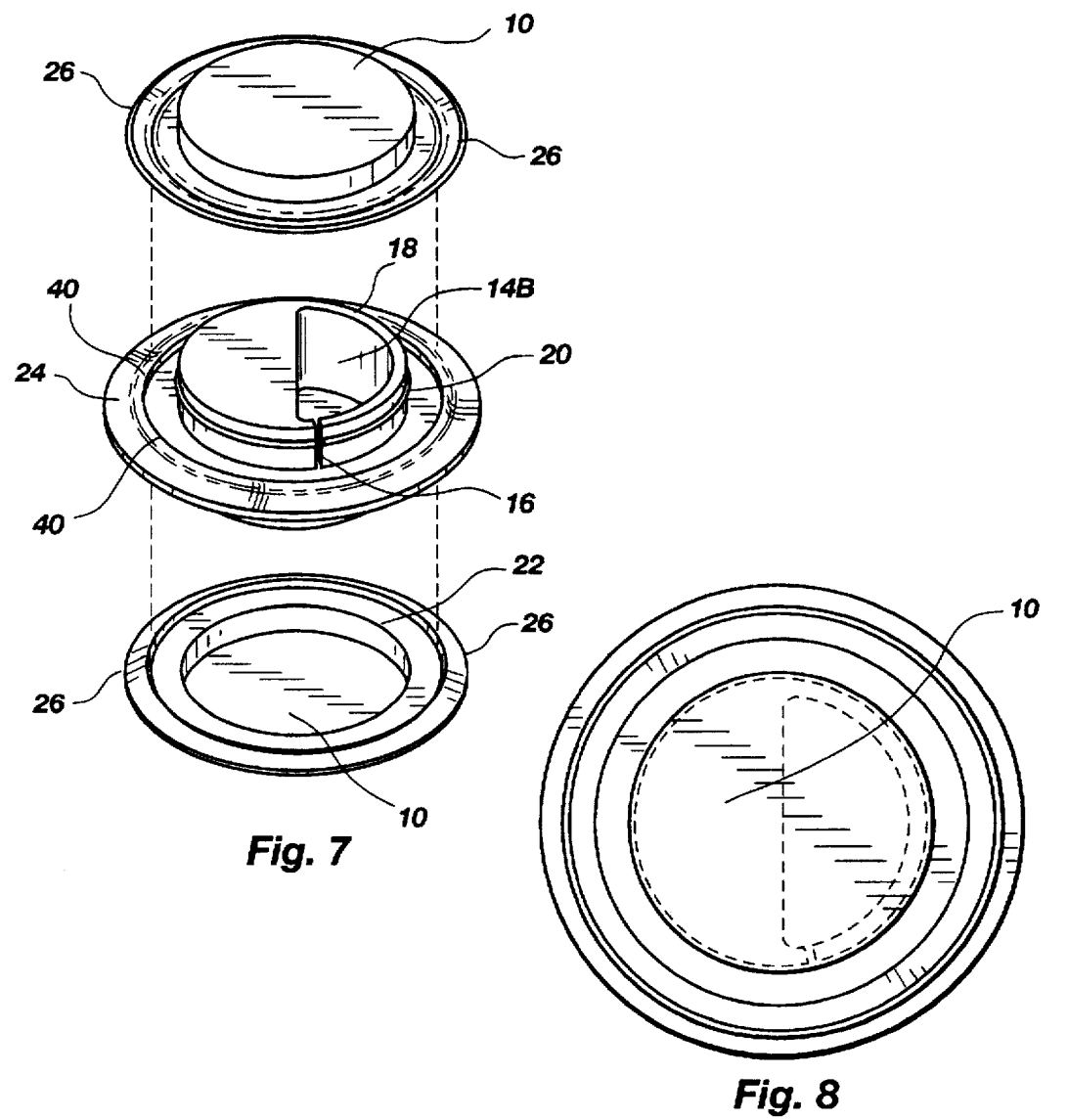
Fig. 7
Fig. 8
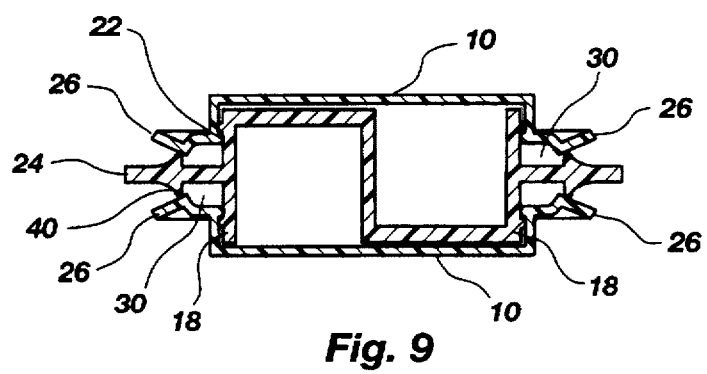
Fig. 9

FISH HOOK LURE AND LEADER CARRIER

RELATED APPLICATION

This is a continuation in part of Ser. No. 08/608,749 filed Feb.29, 1996 now abandoned.

BACKGROUND-FIELD OF INVENTION

This invention relates to a receptacle for holding a pre-tied leader to a hook, a lure, or an artificial fly in a manner which separates the leader from the hook, lure, or fly.

BACKGROUND-DESCRIPTION OF PRIOR ART

Many storage devices have been invented in an attempt to solve some of the fisherman's problems in regards to storing snelled hooks, artificial flies, and lures in a manner which keeps them free from entanglement and damage. The storage device should have the following qualities.
(a) maintains the line tangle-free
(b) isolates the hooks
(c) is compact
(d) is light-weight
(e) has buoyancy
(f) saves time
(g) is cost-effective
(h) is easy to manipulate
(i) is free from moving parts which require lubrication
Accordingly some of the prior art is described below.

U.S. Pat. No. 2,670,564 to Keener issued in March 1954 has a rotating device such as a reel which can fail when clogged by dirt or debris. Hooks and leaders can become loose and entangled.

U.S. Pat. No. 2,716,302 to Dutton issued in August 1955 has a cylinder which turns as a reel. It must be correctly aligned to receive hook and leader and is limited to style and size of hook.

U.S. Pat. No. 2,763,957 to Roberts issued in September 1956 must be aligned to draw leader to correct position. There is a chance of rotating parts binding or clogging with time; particles of dirt may adhere; leader could become displaced.

U.S. Pat. No. 3,008,664 to McCormick issued in November 1961 is for fishing leader only; no hooks are stored.

U.S. Pat. No. 3,039,226 to Bagdonas issued in June 1962 is a receptacle wherein bottom wall becomes top wall of next unit making it impossible to use separately. Also, it would be difficult to identify which. hooks and lures are contained without disassembling.

U.S. Pat. No. 3,680,250 to Hetrick issued in August 1972 can be used only once since water-soluble capsule will dissolve.

U.S. Pat. No. 3,881,273 to Hearing issued on May 6, 1975 is objectionable because fishing leader could easily become kinked and entangled as it is pressed into a confined space. Would be difficult to place leader on rows of posts and to retain tension on line.

U.S. Pat. No. 3,890,737 to Jones issued in June 1975 has a tubular member having a slot to accommodate fish hooks and a flange outside for leader. Hooks can become loose and entangled. The whole receptacle is too bulky.

U.S. Pat. No. 3,940,873 to Lawless issued on May 2, 1976 is limited to single, barbed hooks; no leader is stored.

U.S. Pat. No. 3,991,507 to Bart issued in November 1976 has a plurality of slots for leaders but no place for fish hooks, artificial flies, or lures.

U.S. Pat. No. 4,030,228 to Schaefer issued in June 1977 has spaces for fishing flies only and leader attached to flies.

U.S. Pat. No. 4,036,451 to Pipkin issued in July 1977 has an outer part which must be aligned with an inner part before using. It is recommended that Vaseline be used for lubrication which would make reel subject to dirt and abrasive material. Leaders are not separated on reel which could easily cause entanglement.

U.S. Pat. No. 4,208,825 to Barnes issued on Jun. 24, 1980 holds only hooks and lures, no leaders.

U.S. Pat. No. 4,281,470 to Anderson issued on Aug. 4, 1981 is large and cumbersome. The container exposes hooks and leaders, offering no protection to them.

U.S. Pat. No. 4,452,003 to Duetch issued in June 1984 has the fishing line attached to an eye on the end of a fishing pole. Therefore, it is not related to hook and leader storage.

U.S. Pat. No. 4,468,882 to Marusak issued on Sept. 4, 1984 is a holder for single, barbed hooks or lead weighted hooks.

U.S. Pat. No. 4,604,822 to Christenberry issued on Aug.12, 1986 has an "L" shaped slot which is interlocked with a "U" shaped slot enclosing a hook. It would take time and some dexterity to operate. Designed for hook and lure only, no leader.

U.S. Pat. No. 4,631,856 to Born issued on Dec.30, 1986 exposes fishing gear and leader. It applies to specialized rigs only.

U.S. Pat. No. 4,708,244 to Fish issued on Nov. 24, 1987 holds spools to transfer fishing line from spool to reel. It is not related to hook and leader storage.

U.S. Pat. No. 4,862,635 to Conte issued on Sep. 5, 1989 has moving parts which must be aligned. It would be difficult to place hook in flange.

U.S. Pat. No. 5,020,269 to Gentry issued on Jun. 4, 1991 is an envelope-type container for storing fishing accessories. No leader is stored.

U.S. Pat. No. 5,092,075 to Campos issued on Mar. 3, 1992 is an emergency storage device for a combination hand-casting rod, reel, tackle box, and even a flashlight storage compartment in handle.

U.S. Pat. No. 5,095,645 to Borawski issued on Mar. 17, 1992 is a transparent tubular sleeve which holds lures only.

U.S. Pat. No. 5,185,952 to Bruce issued on Feb. 16, 1993 is a suitcase-like box with a handle. It is too large and cumbersome.

U.S. Pat. No. 5,337,511 to Ashbaugh issued on Aug. 16, 1994 is a cylindrical-type carrying case that hooks to a belt. There are holes for hooks, but none for leaders.

U.S. Pat. No. 5,386,662 to Vader and Vader issued on Feb. 17, 1995 is a rectangular panel with a plurality of parallel slots and sliding spools with penetrating bosses and is limited to types of hooks, flies, and lures.

U.S. Pat. No. 5,426,885 to Wittman issued on Jun. 27, 1995 is a carrying case for fishing gear which is not related to storing snelled hooks and leaders.

OBJECT AND ADVANTAGES

The present fish hook, lure and leader carrier provides a receptacle which stores hooks and leaders free from tangles. Besides protecting the hooks and leaders from damage the leader carrier is easy to load and unload. The carrier is compact and depending upon its size, several carriers can be placed in a single pocket of the fisherman's clothing. The carriers are inexpensive to manufacture, light weight, durable, free from moving parts, need no lubrication, and buoyant which makes them easy to retrieve if dropped into the water. This carrier provides a receptacle which can house snelled hooks, artificial flies, or lures of various sizes and shapes and be opened with one hand to allow the leader with its attachments to be affixed to a fishing line in a matter of seconds. The flat outside surface of the carrier provides a place for labeling contents as to size and type of attachments.

SUMMARY OF THE INVENTION

The fish hook, lure and leader carrier contains 3 separate parts: a central tubular receptacle with a cavity or cavities which hold snelled fish hooks, artificial flies, or lures; and two identical snap on covers. A separating disk extends perpendicularly outward from the tubular central receptacle. The separating disk has two ridge members on the upper and lower surface extending around the circumference of the separating disk forming a groove for winding the leader. The central tubular receptacle has at least one slot allowing the leader to extend beyond the cavity. The slots in the central tubular receptacle extend perpendicularly from the separating disk to the end of the tubular central receptacle. The slots in the wall of the tubular central receptacle are of a dimension that allows leader to pass through the slot but retains the hook and/or lure portion in the cavity of the central receptacle.

The covers, when snapped in place over the ends of the tubular central receptacle, form chambers to accommodate the leader wound around the central receptacle. The tubular central receptacle is designed with a rib which meets with a similar rib on the snap-on cover, both ribs together forming a retainer for the cover. The covers are slightly smaller in circumference than the separating disk. The outer edge of the covers flare outward and away from the disk enough to help form a groove between the separating disk and the covers when the covers are fitted over the ends of the central tubular receptacle but not snapped over the ribs of the central tubular receptacle. This grove facilitates the winding of leaders onto the outer surface of the tubular central receptacle and guides the leaders into the chamber. After the leaders are wound around the central tubular receptacle the covers are snapped in place over the rib of the central tubular receptacle thus retaining the leaders in the chambers formed by the cover and the separating disk and securing the contents of the cavities.

Both covers have a smooth, flat surface on their outward side for the purpose of providing a space for identification of the contents of the fish hook and leader carrier. The three separate parts can be formed from any material which is resilient preferably polyethylene plastic. The tubular central receptacle and the accompanying separating disks may be oval shape, rectangular or other shape which can be determined by the size and shape of the snelled hook, artificial fly or lure. The preferred shape of the fish hook, lure and leader carrier is round. In one embodiment the fish hook, lure and leader carrier has two cavities which are separated by a central septum. The two cavities are formed by a center septum and two end walls which occlude one half the openings on each end of the tubular central receptacle. These end walls cover the area from the septum to the inner wall of the tubular central receptacle member. The two end walls are not positioned opposite each other in the ends of the tubular central receptacle member thereby allowing access from the ends opposite the end wall members. These cavities may be accessed from the opposite ends of the tubular central receptacle. In another embodiment, the end walls are absent providing access to two central cavities from either end of the tubular central receptacle member. In an additional embodiment, the tubular central receptacle is formed without the septum and end walls, providing one single larger cavity which can be accessed from either end of the carrier to facilitate the holding of a larger hook, artificial fly, or lure.

BRIEF DESCRIPTION OF THE DRAWINGS

FIG. 7 is a view of an opened two compartment embodiment of the fish hook and leader carrier with a septum and end walls.

FIG. 8 is top view of the two compartment embodiment fish hook and leader carrier with a septum and end walls when the covers are in place.

FIG. 9 is a closed side view of the two compartment embodiment with the septum and end walls.

DETAILED DESCRIPTION OF INVENTION

Figure 1:
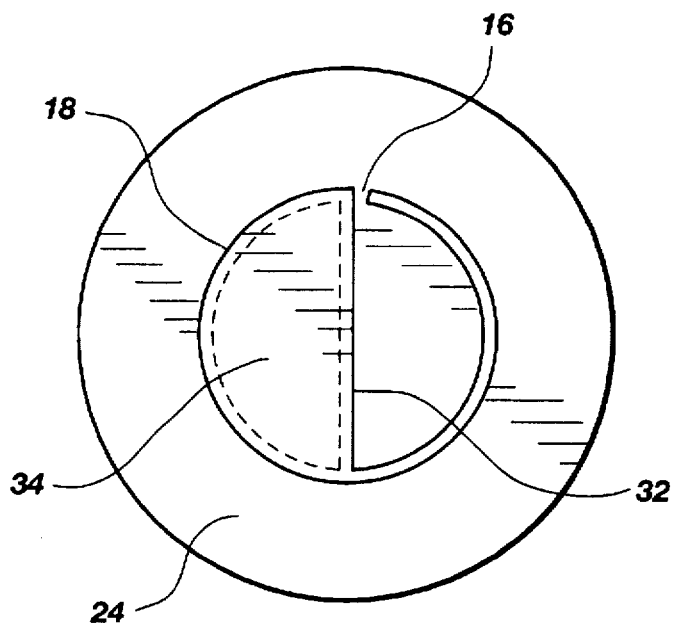
FIG. 1 illustrates a top view of the fish hook and leader carrier without covers.
Figure 2:
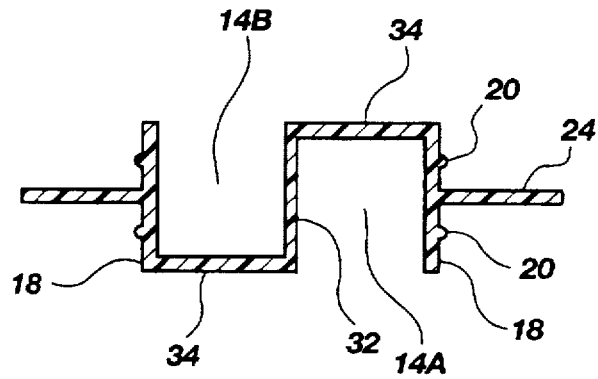
FIG. 2 is a side view of the fish hook and leader carrier without covers.
Figure 3:
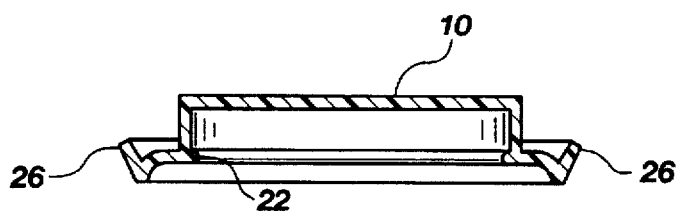
FIG. 3 is a side view of a cover for the fish hook and leader carrier.
Figure 4:
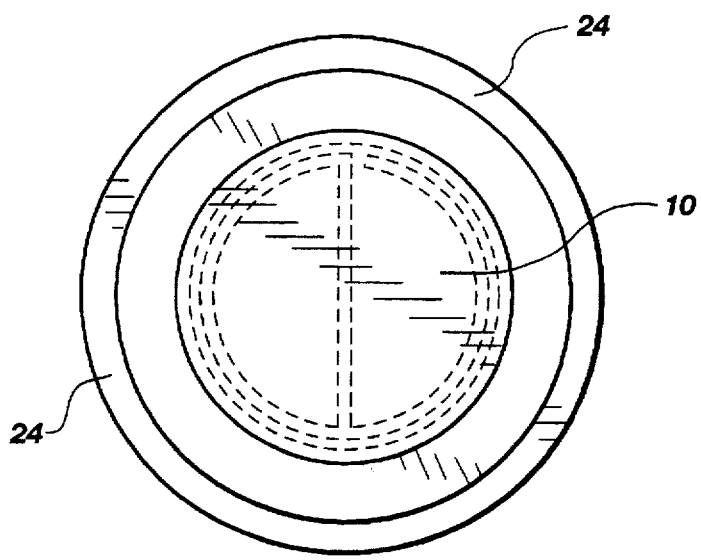
FIG. 4 is a top view of the fish hook and leader carrier with covers in place.
Figure 5:
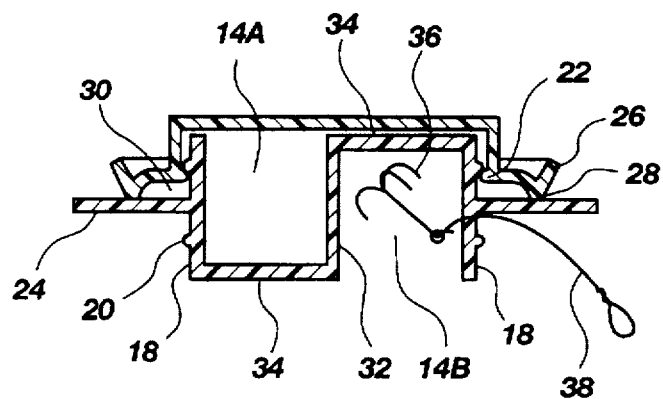
FIG. 5 is a side view of the fish hook and leader carrier with hook and leader shown and one cover in place.
Figure 6:
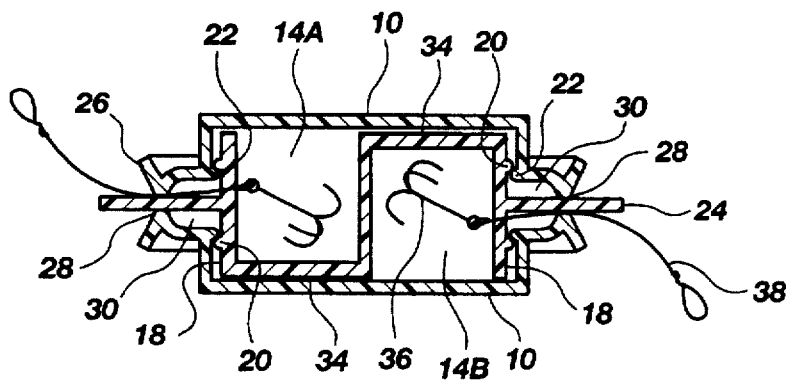
FIG. 6 is a side view of the fish hook and leader carrier with hook and leader shown and two covers in place.
Figure 10:
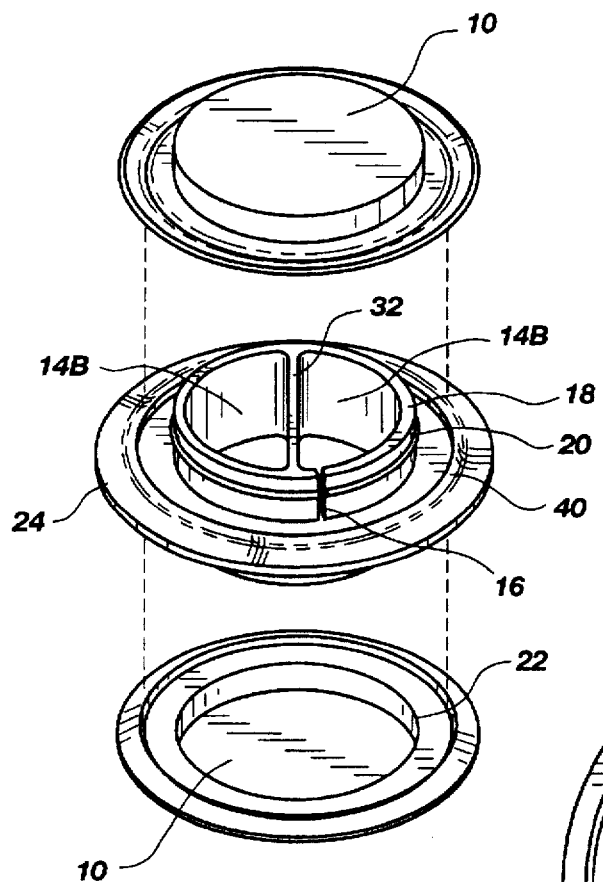
FIG. 10 is a view of an opened two compartment embodiment of the fish hook and leader carrier with a septum and without the end walls.
Figure 11:
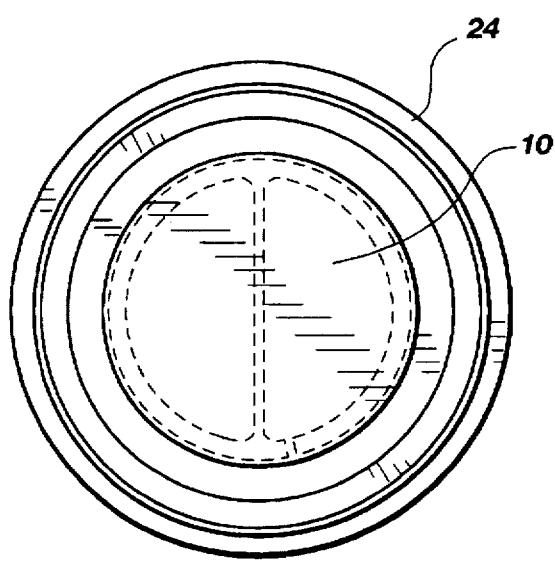
FIG. 11 is a top view of a two compartment embodiment of the fish hook a leader carrier with a septum and without the end walls when the covers are in place.
Figure 12:
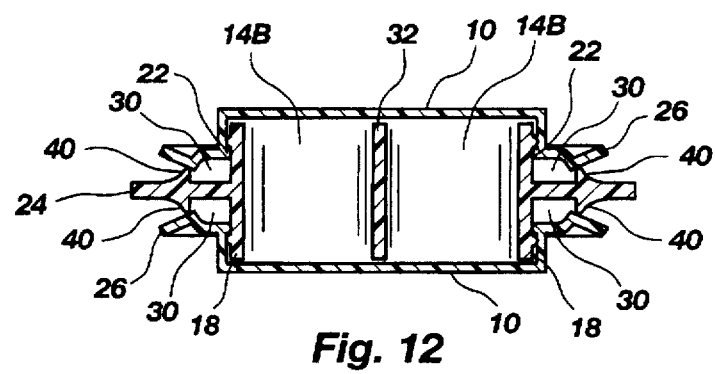
FIG. 12 is a closed side view of a two compartment embodiment with the septum and without end walls.
Figure 13:
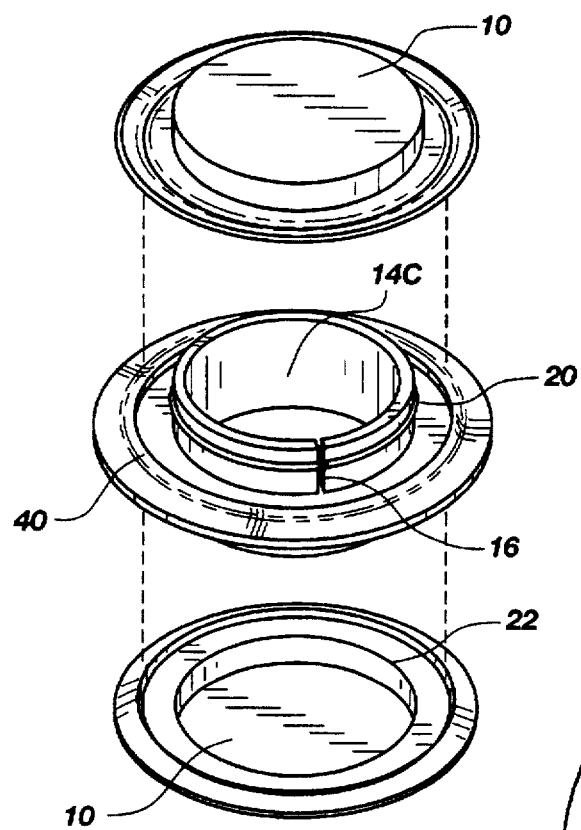
FIG. 13 is a view of an open single compartment embodiment of the fish hook and leader carrier without end walls and septum.
Figure 14:
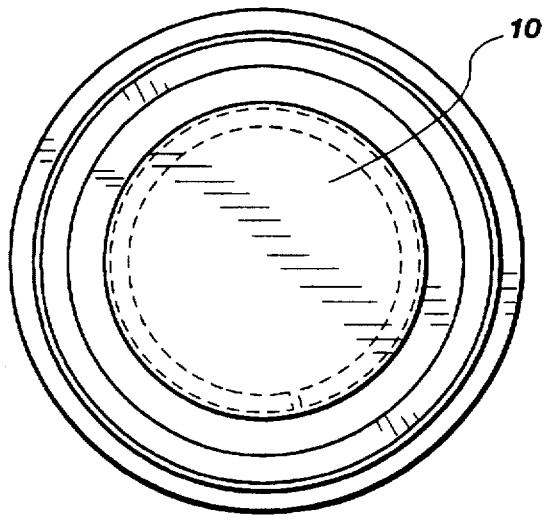
FIG. 14 is a top view of a single compartment embodiment of the fish hook and leader carrier with the covers in place.
Figure 15:
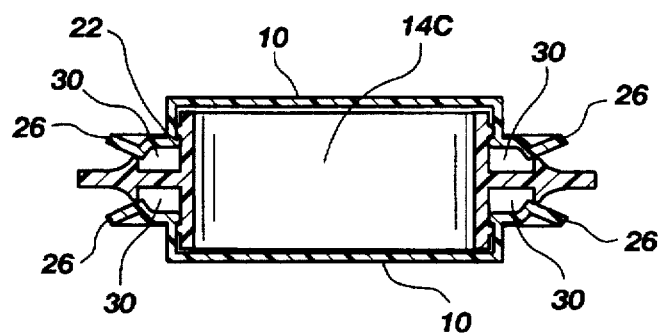
FIG. 15 is a closed side view of a single cavity embodiment of the fish hook and leader carrier.

The hook and leader carrier components consists of two identical covers 10 that snap on either end of the main tubular central receptacle 18 and an separating disk 24 extending perpendicularly from the main tubular central receptacle 18. The cover 10 when snapped over the end of the main tubular receptacle opposes the separating disk 24. The outer edge of the cover 10 has a flared portion 26 which when snapped together with the central receptacle 18 comes in contact with the rib 40 on the separating disk 28 forming storage chamber 30. The rib 22 on the cover complements a like rib 20 on the central receptacle which serves as a means of snapping the cover 10 to the central receptacle 18. The covers 10 have a smooth, flat surface on their outward facing sides for identification of contents. The whole carrier body is preferably round but is not limited to that shape. It is of a dimension that one or several carriers can fit easily in a fisher's vest or pant pocket.

FIGS. I shows the hook and leader carrier's main components comprising two cavities 14a within a tubular central receptacle 18 for holding snelled fish hooks 36 in a manner which keeps the hooks 36 separated from their leaders 38, and a separating disk 24 which is perpendicular to the tubular central receptacle 18 at the middle of the tubular central receptacle 18. The purpose of the separating disk 24 is to separate the two wound leaders 38. The separating disk 24 extends beyond the snap-on covers 10 to facilitate the guiding of the leader 38 on the carrier when the cover is adjacent but not snapped over the ribs 20 of the central tubular receptacle. The two cavities 14a which are formed by septum 32 and end walls members 34 can be accessed from opposite ends of the carrier. The tubular central receptacle 18 has two slots 16 adjacent to the septum 32 to allow the leader 38 to extend out of the cavity 14a. The slots 16 extend perpendicular from the separating disk 24 to the end of the tubular central receptacle 18. In a dual hook and leader carrier, a septum 32 separates the two cavities 14a which are accessed from opposite ends of the central receptacle. The central receptacle of the hook and leader carrier ideally has dual cavities as noted previously, but has the option of a single cavity 14c to facilitate holding a larger hook, artificial fly, or lure when septum 32 is omitted and end walls members 34 are not present. Another embodiment is created which has two cavities 14b that are accessible from either end. This embodiment lacks end wall members 34.

To use this invention the cover 10 is removed from the tubular central receptacle 18 and a snelled hook 36 is placed within the open cavities 14a, 14b, or 14c with its attached leader 38 in the slot 16. The cover 10 is then replaced and the leader 38 can now be received by the carrier. The cover is held in place by the meeting of rib 22 on the inside of cover with a complementary rib 20 located on the outside surface of the tubular central receptacle 18. A groove is formed between cover 10 and the separating disk 24 which facilitates the winding of the leader around the outside of the central tubular receptacle 18. Tension on leader 38 causes it to slide into the leader storage chamber 30. After the winding of the leader 38 around the central tubular receptacle 18, the act of snapping the cover in place which causes rib 22 and rib 20 to engage each other, secures leader 38 in place in storage chamber 3reverse the operate snelled hook 36 simply reverse the operation or, optionally, remove the cover 10, thus exposing the hook which can easily be removed with its attached leader 38.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A fish hook, lure, and leader carrier comprising;

a tubular central receptacle member having an interior surface and an exterior surface;

said interior surface of said tubular receptacle member forming a compartment accommodating a fishing device selected from the group consisting of fish hooks and lures;

said tubular central receptacle member having a separating disk structure attached to the exterior surface of said tubular central receptacle member;

said separating disk having an upper surface and a lower surface;

said separating disk structure being perpendicular to said exterior surface of said tubular central receptacle member;

said separating disk structure having a ridge member on said upper and said lower surface of said separating disk structure;

said ridge member located inwardly of the circumference of said separating disk structure;

said ridge member being positioned to form a groove between said tubular central receptacle member and said ridge member;

said groove accommodates a leader which is positioned against said tubular central receptacle member;

said tubular central receptacle member having slots which allow said leader to penetrate said compartment;

said tubular central receptacle member having a first and second rib member located outwardly of the circumference of said tubular central receptacle member;

said first and second rib member being adjacent to the ends of said tubular central receptacle member;

said first and second rib member extending perpendicularly from the exterior surface of said tubular central receptacle member;

a first and a second cover member;

said first and said second cover member being formed to snugly engage said first and said second rib members respectively;

said first and said second cover members having rib projections that snaps over said first and second rib members on said tubular central receptacle member; and said cap member being formed to create a leader storage chamber with said groove on said separating disk when snapped into place.

2. A fish hook, lure, and leader carrier as claimed in claim 1 wherein said tubular central receptacle member has a septum member attached across the width of said tubular central receptacle member dividing the interior of said tubular central receptacle member into two compartments; said compartments accommodating said fish hooks and or said lures.

3. A fish hook, lure, and leader carrier as claimed in claim 2 wherein said tubular central receptacle member has end walls which occlude one half the opening covering the area from said septum to one half the edge of said tubular central receptacle member on each end of said tubular central receptacle member; said end walls not being positioned opposite each other in said ends of said tubular central receptacle member.

4. A fish hook, lure and leader carrier as claimed in claim 3 wherein said carrier is formed from polyethylene plastic.

5. A fish hook, lure and leader carrier as claimed in claim 2 wherein said carrier is formed from polyethylene plastic.

6. A fish hook, lure and leader carrier as claimed in claim 1 wherein said carrier is formed from polyethylene plastic.

* * * * *